May 5, 1959 E. H. B. BARTELINK 2,885,470

TELEVISION TRANSMISSION QUALITY TESTING SYSTEM

Filed Dec. 20, 1954 5 Sheets-Sheet 1

INVENTOR.
EVERHARD H. B. BARTELINK

BY H. L. Mackey

ATTORNEY.

TELEVISION TRANSMISSION QUALITY TESTING SYSTEM

Filed Dec. 20, 1954 5 Sheets-Sheet 2

INVENTOR.
EVERHARD H. B. BARTELINK
BY H. L. Mackey
ATTORNEY.

INVENTOR.
EVERHARD H. B. BARTELINK
BY H. S. Mackey
ATTORNEY.

May 5, 1959 E. H. B. BARTELINK 2,885,470

TELEVISION TRANSMISSION QUALITY TESTING SYSTEM

Filed Dec. 20, 1954 5 Sheets-Sheet 4

INVENTOR.
EVERHARD H. B. BARTELINK

BY

ATTORNEY.

May 5, 1959 E. H. B. BARTELINK 2,885,470

TELEVISION TRANSMISSION QUALITY TESTING SYSTEM

Filed Dec. 20, 1954 5 Sheets-Sheet 5

INVENTOR.
EVERHARD H.B. BARTELINK

BY H. S. Mackey
ATTORNEY.

United States Patent Office 2,885,470
Patented May 5, 1959

2,885,470

TELEVISION TRANSMISSION QUALITY TESTING SYSTEM

Everhard H. B. Bartelink, Concord, N.H., assignor to General Precision Laboratory Incorporated, a corporation of New York Application December 20, 1954, Serial No. 476,289

6 Claims. (Cl. 178—6.8)

This invention pertains to the testing of quality in television transmission systems and more particularly to selective testing of transmission fidelity at different frequencies in the transmitted frequency band and to testing gamma linearity.

This application is a continuation-in-part of the copending application of Everhard H. B. Bartelink, Serial No. 374,092, filed August 13, 1953 and now abandoned.

Point-to-point transmission of television programs, usually employing either coaxial cable or radio relay, requires strict and continuous quality control because of the spot news character of some programs and because a large part of the transmissions consists of live program material and therefore is of a once-only nature.

Monitoring of transmission circuit quality by observation of conventional test patterns is useful, but cannot be employed for the continuous monitoring demanded by maintenance of the highest transmission quality, since such conventional test patterns are transmittable only during non-program intervals. In addition, "gamma fidelity" or linearity of video response is indicated in the conventional test patterns in a manner difficult to evaluate with any precision. Moreover, evaluation of quality by means of conventional test patterns is not sufficiently quantitative in nature, and quality of transmission of different video frequencies is difficult to evaluate with any accuracy.

The present invention overcomes these difficulties by providing a test signal that is transmitted at all times, even during program transmission, and that has several components specifically designed to test the transmission of high, intermediate and low video frequencies and to test gamma fidelity. This signal can be received at any point in the transmission chain to test any one or more of its components. Any reduction in transmission quality indicated by the use of this test signal is attributable to a transmission circuit fault of some kind, for example, a drift in the characteristic of an electronic tube, or a drift in tuning of a radio relay receiver, and the cause may then be found and corrected. Such faults are not easily found at present by any means known to the art until they have affected the picture quality in a very appreciable manner.

In carrying out the invention a generator is provided that produces a test signal composed of suitable successive components. This signal is applied to the television circuit at the studio, being so synchronized and phased in its insertion in the composite video and synchronization signal as not to interfere with either the video signal or the synchronization signals. The combined signal including the test signal is transmitted over the transmission system and may be monitored by simple test signal monitoring equipment at the end of the transmission system or at any intermediate point. At the end of the transmission system the test signal is removed from the combined signal, leaving the normal television signal for delivery to the utilizing equipment, which may be, depending on the circumstances, a television broadcasting radio transmitter, a television video receiver, an intermediate film processor, or a wire network serving a number of receivers.

The test signal generation and injection equipment of this invention, may also serve the function of taking the place of the conventional monoscope test pattern generator if desired. A switch is provided in the test signal generator for this purpose which causes the test signal to be sent continuously and thus to appear as a video pattern on any television receiver connected to the system. This pattern provides some of the information regarding transmission quality that would be furnished by the conventional monoscope test pattern.

The instant invention may also be utilized to display a single horizontal trace modulated by the test signal at the top of the television picture on all receivers served by the television system. This line can be masked if desired at any individual receiver merely by adjusting the vertical framing thereof, or the line can be left visible and used to indicate frequency response, gamma and linearity. When desired to use the device of the invention in this manner it is merely necessary to eliminate the test signal-removing equipment from the circuit.

The general object, then, of this invention is to provide continuous monitoring equipment for television transmission systems More specifically, the object of this invention is to provide equipment for permitting continuous observation of the quality of transmission in a television transmitting system during picture transmission, the observed information being of such nature as to lead readily to correction of transmission difficulties.

Further understanding of the invention may be secured from the detailed description and the associated drawings, in which.

Figure 6A:
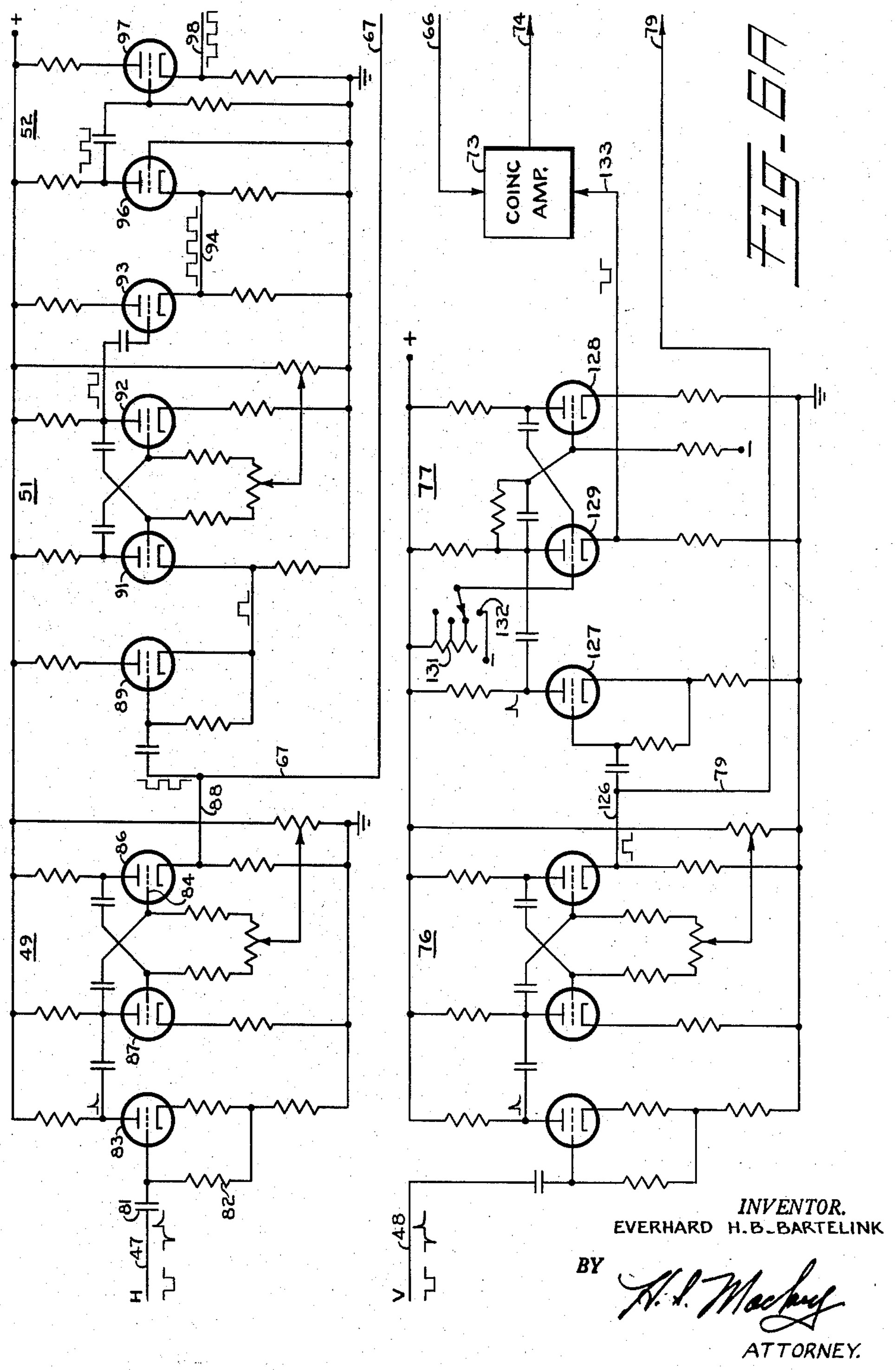
Figure 6B:
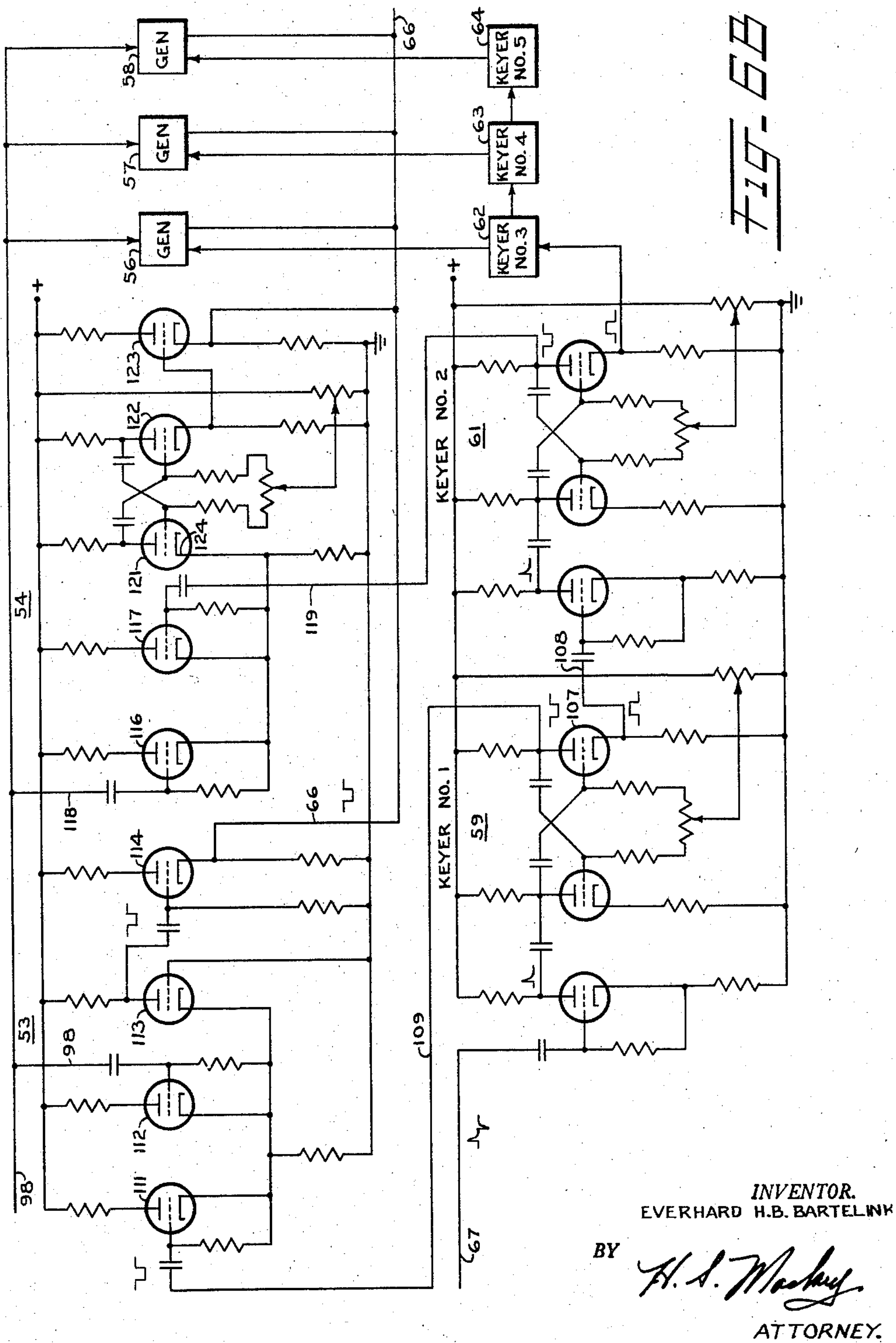

Figures 6A and 6B taken together constitute a schematic drawing of the oscillator and switch circuit of the invention.

Figure 7:
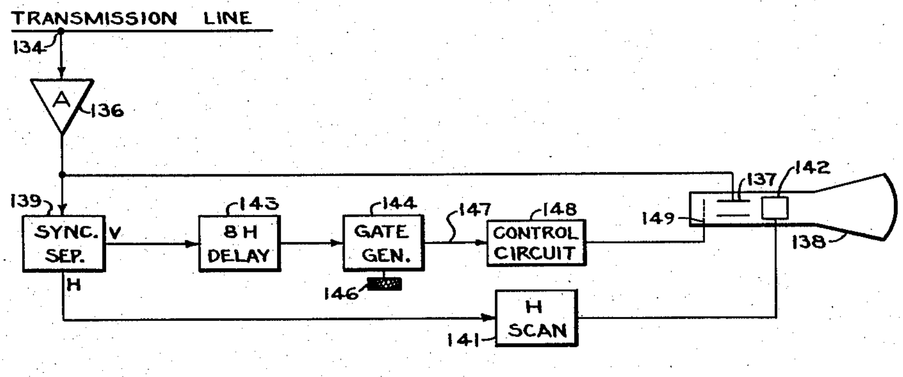

Fig. 7 is a block diagram of an instrument for observing the test signal wave form.

Figure 8:
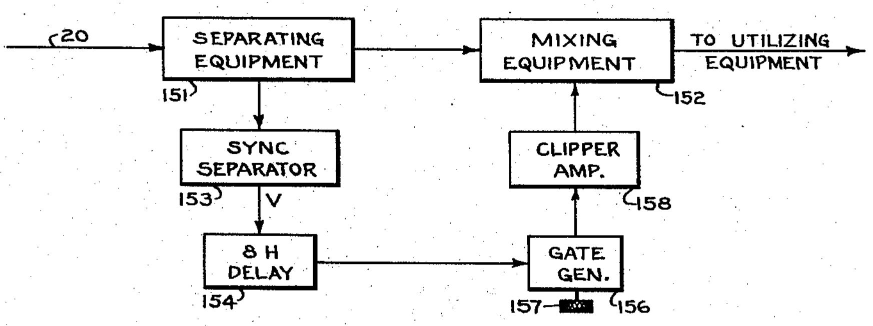

Figure 8 is a block diagram of a circuit for removing the test signal.

Figure 1:
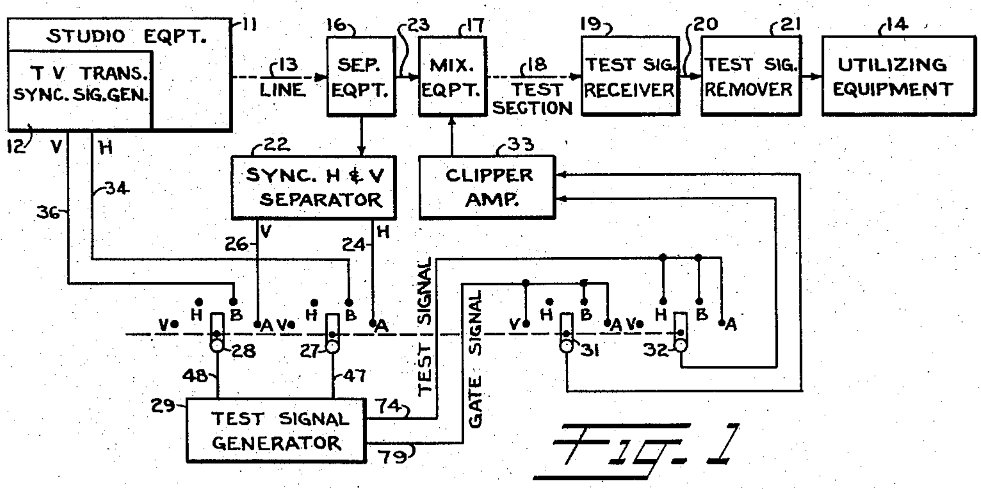
Figure 1 is a block diagram illustrating the general application of the invention.

Referring now to Fig. 1, there is illustrated in block form television studio equipment 11 including a conventional synchronization signal generator 12. The composite television signal is transmitted by any means, which, for example, may be radio or coaxial cable as indicated by the line 13, to the utilizing equipment 14 which may be a television relay station, a radio transmitter, a television receiver or other equipment. A synchronization signal separator 16 for separating the synchronization signals from the composite signals and conventional mixing equipment 17 for mixing the special test signal with the video signal are placed at any accessible point in the transmission line where video signal frequencies exist, or at the studio or in the radio transmitting station for the purpose of injecting the test signal of the invention. The mixing equipment 17 transmits its output signal to whatever equipment or line section is to be tested, represented schematically by line section 18. Following this section, the special test signal is observed by a test signal receiver 19. The special test signal is then erased by the test signal remover 21, leaving the composite video with synchronization signals to proceed to utilizing equipment 14. It is of course to be understood that the test signal receiver may be applied at any point between the mixing equipment 17 and the test signal remover 21, not only to test a line section, but also to test any component of equipment.

The separating equipment 16 is conventional and includes circuits for separating the video picture signal from the horizontal and vertical synchronization signals. The video signal is transmitted to the mixing equipment 17 and the composite synchronization signal is transmitted to a conventional horizontal and vertical synchronization signal separator 22. The composite synchronization signal is also regenerated and transmitted through conductors 23 to mixing equipment 17 for recombination with the video picture signal. The horizontal and vertical synchronization signal separator 22 transmits the separated synchronization signals through conductors 24 and 26 and switch sections 27 and 28 to a generator 29 for producing the test signals of this invention. The generated signals are passed through switch sections 31 and 32 to a conventional clipper amplifier 33 and from it to the mixing amplifier 17. In this use all switch sections 27, 28, 31 and 32 are placed at their position A.

When the switch sections are so positioned the equipment operates during the transmission of a television program, injecting its special test signal into the video circuit preceding the line, circuit or equipment that is to be tested, and then removes the special test signal before the video signal reaches the television receiver or other utilizing equipment.

At times it may be convenient to utilize the horizontal and vertical synchronizing signals directly from the studio equipment generator for the purpose of synchronizing the test signal generator, thus eliminating the requirement for synchronization separators 16 and 22. In such cases the switch sections at the test signal generator are placed at their B positions, so that the horizontal and vertical synchronizing signals generated by the studio synchronizing signal generator 12 are applied through conductors 34 and 36 to switch sections 27 and 28 and from them to the test signal generator 29.

When there is a requirement for testing any television equipment or line in the absence of a television signal, either in the studio or in the field, it is convenient to generate signals within the test signal generator without the aid of externally-supplied horizontal and vertical synchronizing signals, thus enabling testing to be carried on anywhere and at any time independently of any television transmitting equipment. In this use either the special test signal may be employed and received on the test signal receiver 19, or a signal simulating a vertical synchronizing signal may be generated and transmitted from the test signal generator and received on the test signal receiver 19. In order to use the equipment in this manner the switch sections are adjusted to the H position to transmit the special test signal at horizontal line frequency or alternatively the switch sections are adjusted to the V position to transmit the self-generated simulated vertical synchronizing signal.

Figure 2:
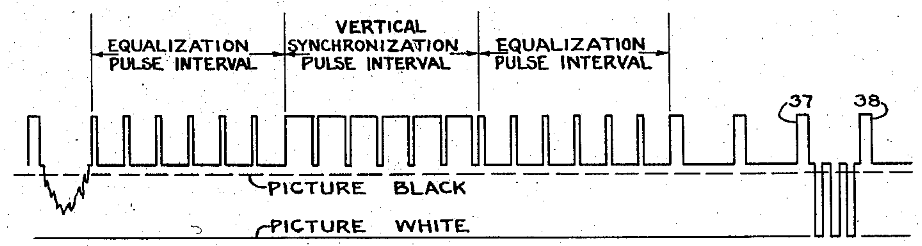
Figure 2 illustrates the method of insertion of the test signal in the video signal.

The test signal generated in the test signal generator 29 consists of a series of four or five different signal components, transmitted consecutively and repeatedly. Each of the several different signal components has a duration of five microseconds ($\mu$s.) and each component is spaced from the preceding component by 5 $\mu$s. so that the entire group of four or five components can be inserted in one of the horizontal periods immediately following the vertical synchronization signal and preceding the beginning of the picture signal, as indicated in Fig. 2 between the horizontal synchronization pulses 37 and 38. After the vertical synchronization pulse interval and the succeeding equalizing pulse interval there follows a number of horizontal scan periods or lines, which may vary from 7 to 15 in number, in which no picture information is transmitted. This interval, commonly termed the vertical synchronization signal "back porch," is available for test use and any single one or group of the horizontal lines therein can be used to carry the test signal. In Fig. 2 the third horizontal interval and line after the equalizing signal are so used.

Figures 3A, 3B, 3C, 3D:
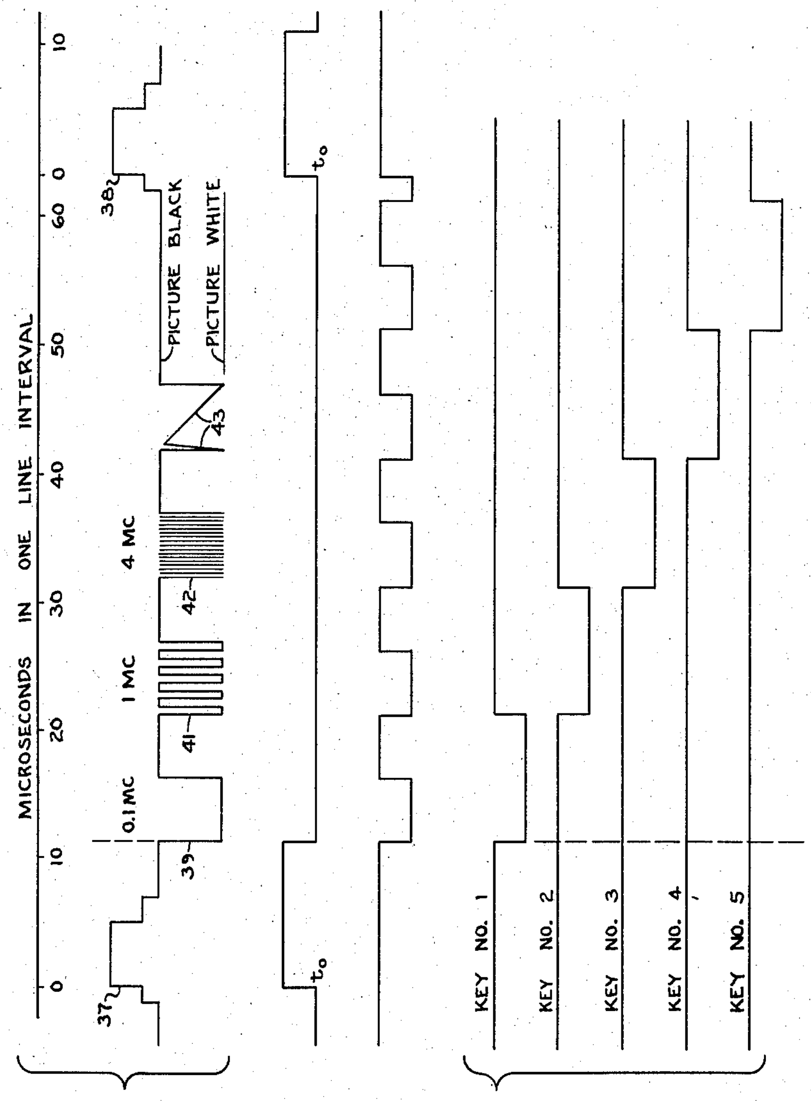
Figures 3A, 3B, 3C and 3D depict graphs of the wave forms of the test signal and of keying components.

The test interval of Fig. 2 is expanded in Fig. 3A, the eighth horizontal synchronization signal after the beginning of the vertical synchronization signal being indicated at 37 and the succeeding horizontal synchronization signal at 38. The test signal consists of four, 5-$\mu$s. components, each of which has a different shape and frequency spectrum, designed to examine the transmission quality by four different tests.

The first test signal component 39 begins 11 $\mu$s. after the front edge of the horizontal synchronization pulse 37. This signal component has the shape of one-half cycle of a square wave and has a duration of 5 $\mu$s. It is followed by a 5 $\mu$s. space so that, considered with the space, the component consists of a single cycle of a 0.1 mc. square wave, having a voltage magnitude which extends from picture black as base to picture white as maximum. The function of this signal component is to test the ability of the transmission system to transmit signals having frequencies in the order of 0.1 mc. If the picture white crest slopes upward toward the right, poor transmission of lower frequencies is indicated. If the leading corners are unduly rounded, poor transmission of higher frequencies is indicated.

The second signal component, 41, consists of five cycles of a 1-mc. rectangular wave form. This signal also extends to picture white level and covers a 5 $\mu$s. interval, followed by a 5 $\mu$s. space. The function of this signal is to test transmission in the vicinity of 1 mc. Shortening of this signal component in the vertical dimension indicates poor transmission at the 1 mc. frequency.

The third signal component 42 also preferably has a rectangular wave form, although it may instead have a sinusoidal form, if desired, and has a frequency of 4 mc. for use in local circuits and over microwave relay circuits having an upper cutoff not lower than 4 mc. For use in conjunction with coaxial cable transmission lines this test form may have a frequency of 2.8 mc. or somewhat less. This signal component extends to picture white level and covers a 5 $\mu$s. interval, followed by a 5 $\mu$s. space. Shortening of the received height of this component indicates poor transmission of the signal frequencies near the frequency of this component.

The fourth signal component 43 has saw-tooth form with an initial spike. This saw-tooth starts at picture black and slopes downward to picture white. The slant side as inserted is preferably perfectly straight, for the function of this component is to indicate faults of the gamma linearity in the transmission circuit. When the gamma transmission of the component being tested is nonlinear, the slant side of the saw-tooth form as observed at the test signal receiver will depart from a straight line. Such departure indicates that the response of the circuit under test is nonlinear as respects the applied voltage, and the grays in a picture transmitted through such a circuit will consequently be either lighter or darker than the grays of the object being televised.

The initial spike marking the beginning of the 5 $\mu$s. interval of the saw-tooth is useful when the test signal is observed on a conventional television receiver picture tube as a dashed line which ideally consists of four or five black lines or intervals, all of exactly the same 5 $\mu$s. length, separated by 5 $\mu$s. spaces.

Figure 4:
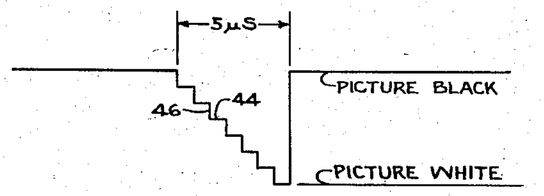
Figure 4 illustrates the wave form of an optional component of the test signal.

In addition to the test signal component forms illustrated in Fig. 3A, a step or staircase test component as shown in Fig. 4 may be added. This signal component permits gamma non-linearity to be measured quantitatively, by measuring the heights and widths of the steps at the several points of the pattern and comparing them. All treads 44 and risers 46 are generated so that as measured on a cathode ray tube screen they are of equal length. Any inequalities in these lengths found in transmission circuit testing must in general be caused by gamma nonlinearity and cannot arise otherwise. A suitable circuit for generating a wave form of this pattern is described in the copending application Serial No. 204,796, filed January 6, 1951, now Patent No. 2,712,064 issued June 28, 1955 entitled Test Pattern Generator, by Gillette et al., and assigned to the same assignee.

When this step test component signal is employed it is inserted in the same horizontal scan line as the previously described four components of the test signal, following the last one thereof and separated therefrom by a 5 µs. space.

Figure 5:
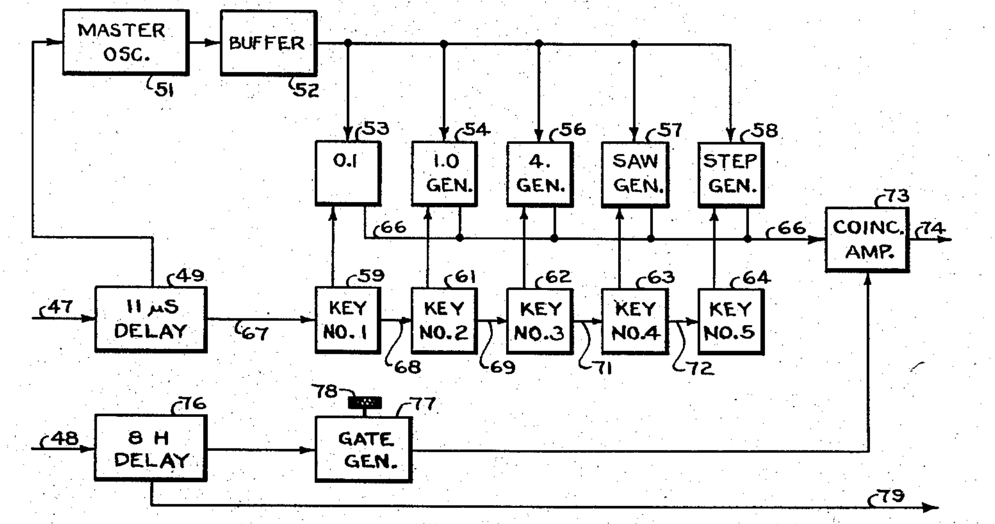
Figure 5 is a block diagram of the signal generator and of its connections to the circuit of the invention.

The circuits represented by the rectangular block 29 in Fig. 1 are more fully indicated in Fig. 5, in which the horizontal synchronizing pulses are applied through conductors 47 to an 11 µs. delay circuit 49. This circuit produces a rectangular 11 µs. pulse, then is quiescent until triggered by the next horizontal synchronizing pulse, resulting in a signal having a wave form as in Fig. 3B, in which $t_0$ represents the time of occurrence of the front edge of a horizontal synchronizing pulse.

The signal of Fig. 3B is applied to a master oscillator 51 so that between the 11 µs. periods it produces a signal having rectangular wave form whose frequency is 0.1 mc.p.s. Such a signal is illustrated in Fig. 3C. This square wave signal is passed through a conventional cathode follower buffer stage 52 and is then applied in parallel to a series of generators 53, 54, 56, 57 and 58. Each generator contains a coincidence circuit and also provision for producing one or the other of the signal forms illustrated in Figs. 3A and 4. The generator 58 produces the stepped form of Fig. 4 and its inclusion is optional as before mentioned.

Each of these four or five generators is keyed by keying circuits 59, 61, 62, 63 and 64 to connect their outputs in turn to a common output circuit conductor 66. The first keying circuit is triggered by the 11 µs. delay circuit through conductor 67, and each keying circuit produces a 9 or 10 µs. rectangular pulse, each except the first being triggered by the trailing edge of the preceding pulse, through conductors 68, 69, 71 and 72. The time-voltage relations of these five keying circuit outputs are indicated in Fig. 3D.

The consecutive wave patterns on the common output bus 66 are applied to a direct-coupled amplifier and coincidence circuit 73 having an output conductor 74 carrying the special test signal. This signal is applied as indicated in Fig. 1 through the switch 32 to the clipper amplifier 33.

Vertical synchronizing signals are applied in Fig. 5 through conductor 48 to a delay circuit 76 interposing a delay of the duration of 8 horizontal lines. The output in the form of the forward edge of a rectangular pulse triggers a gate circuit 77, which emits a rectangular pulse that is adjustable to a length equal to the period of 1, 4 or 6 horizontal lines or can be adjusted to remain on continuously. These adjustments are schematically indicated by an adjusting knob 78. The time gate emitted by the gate generator 77 is applied to the amplifier and buffer 73 to permit passage of the test signal only for the duration of the gate.

In the foregoing description of Fig. 5 it has been stated that horizontal and vertical synchronization pulses are applied to the circuit through conductors 47 and 48, which is the case for the situations in which the switch of Fig. 1 is in position A or B. If, however, the switch is in its position H no horizontal or vertical pulses are supplied externally. In that case the 11 µs. delay circuit 49 is made of such form as to be free-running and to emit a positive rectangular half cycle 11 µs. long followed by a negative half cycle not less than 52½ µs. long and preferably about 55 to 60 µs. in length. The entire cycle is then 66 to 71 µs. long. Such a circuit, which may comprise a multivibrator, can easily be made to be triggered by horizontal pulses having the conventional 63½ µs. periodicity, slightly less than the free-running period, and to be inherently free-running in the absence of such synchronizing pulses. The operation of the test signal output will then be exactly as described except that additional waiting time is inserted after the last test form to make the total period 66 to 71 µs. instead of 63½ µs.

When the switch is placed at its V position a synthetic vertical synchronization signal is required for application to the conductor 79, Fig. 1. Such a signal is easily generated in the 8H delay circuit 76 by making it free-running in the same manner as described in connection with circuit 49. The output, resembling the vertical synchronizing pulse except that its period is slightly longer, is applied through conductor 79, Figs. 1 and 5, and the switch 31 to the clipper amplifier. Reception of this signal is effected by means of conventional oscilloscope circuits contained in the test signal receiver 19.

The 11 µs. delay circuit 49 is schematically indicated in Fig. 6A, in which the input conductor 47 is connected through a differentiating condenser 81 and resistor 82 to a trigger tube 83. The input horizontal synchronizing signal front edges produce positive spikes at the plate of the tube 83 which are applied to the grid 84 of tube 86, making it conduct. The tube 86 together with tube 87 constitutes a free-running multivibrator having unequal lengths of states, or conditions, the tube 86 remaining conductive for 11 µs. and the tube 87 remaining conductive for 55 to 60 µs. Therefore when tube 86 receives the horizontal pulses it is synchronized by them and the circuit operates as a monostable multivibrator but when the horizontal pulses are withheld the circuit acts as a free-running square wave generator.

The output taken from cathode conductor 88 operates by its trailing edge a normally conductive trigger tube 89 to stop current flow therein. This stops the current flow in the tube 91, which with tube 92 constitutes a master oscillator 51 of the free-running multivibrator type. When the current flow in tube 91 is stopped the oscillator becomes free-running and generates its 10 mc.p.s. square wave. The output of this oscillator, which is taken from the cathode follower 93 at conductor 94, continues at a periodicity of 10 µs. until stopped by the beginning of the next 11 µs. period.

The master oscillator 51 is followed by a buffer 52 which may consist of a grounded grid amplifier 96 and a cathode follower 97, the output thereof at conductor 98 being applied to all signal form generators 53, 54, 56, 57 and 58, Fig. 6B.

All of the signal generators 53, 54, 56, 57 and 58 are keyed by similar individual keying circuits 59, 61, 62, 63 and 64. The first keying circuit 59 is similar to the 11 µs. delay circuit 49 except that its component magnitudes are such that it operates as a monostable multivibrator with a key-on period of about 8 µs. It is keyed on by the trailing edge of the 11 µs. pulse from conductor 88 through conductor 67 to make the normally nonconductive tube 107 conductive. The cathode output at conductor 108 is indicated as the first graph of Fig. 3D. This output voltage is applied to the second and similar keying circuit 61, the trailing edge initiating the pulse of this circuit, which is 10 µs. long. Thus each keying circuit at the termination of its period initiates the period of the next keying circuit.

The output conductor 109 from the plate of tube 107 applies an 8 µs. rectangular negative pulse to the grid of tube 111, this tube with tube 112 comprising a coincidence circuit. The grid of tube 112 is energized negatively from conductor 98 during the first 5 µs. half of each cycle of the master oscillator. During the first such half cycle, then, both tubes 111 and 112 are made nonconductive so that the following tube 113 is made to conduct, applying a 5 μs. square negative pulse to the common output conductor 66 through cathode follower 114. This pulse is represented in Fig. 3A by the 0.1 mc. half cycle.

The 1 mc. generator 54 includes two coincidence tubes 116 and 117, made negative respectively through conductors 118 and 119 by the second master oscillator cycle and by the output of keyer 61. The coincidence tubes therefore cease to carry current, removing the bias from tube 121, which together with tube 122 comprises a free-running multibrator oscillator having a 1 mc. frequency and which thereupon immediately commences to oscillate. The output of this generator is applied through cathode follower 123 to the common output bus 66. At the end of the 5 μs. period the voltage of cathode 124 is so increased as to stop the oscillations.

The oscillator 56 is similar to the last described oscillator and is similarly started and stopped to apply 4 mc. oscillations to the common bus 66 at the time indicated in Fig. 3A. The oscillator 57 is a conventional saw-tooth oscillator preceded by a differentiating circuit to produce the spike and saw-tooth 43 of Fig. 3A and is started and stopped as described, as is circuit 58 also.

Vertical synchronizing pulses are applied in Fig. 6A through conductor 48 to the delay circuit 76 including a differentiating circuit. This component is similar to the 11 μs. delay circuit 49, Fig. 6A, except that the delay approximates the duration of 8 horizontal lines or 508 μs., with an off period such that the total free-running period is slightly greater than the vertical synchronizing period. Therefore, when vertical synchronizing signals are applied the circuit operates as an eight-horizontal-line delay monostable multivibrator, but in the absence of such signals it operates as a free-running generator of square waves having one condition persisting for 8 horizontal lines and the other condition persisting for 260 horizontal lines or slightly longer.

The termination of the 8 horizontal line period output pulse on conductor 126 causes the trigger tube 127 to become momentarily nonconductive, starting the gate of the gate generator 77 by making normally nonconductive tube 128 conductive. This tube with tube 129 constitutes a monostable multivibrator having an "on" period that can be adjusted to equal one, four or six horizontal periods, or 63½, 254 or 381 μs. This adjustment is made by means of the adjustable tapped resistor 131. A fourth tap 132 connected to negative battery forces tube 128 to be conductive at all times, in effect producing a gate of infinite duration. The output, consisting of a rectangular negative pulse of adjustable duration, is taken from the cathode of tube 129 through conductor 133.

The coincidence amplifier 73 is similar to coincidence circuit 53, Fig. 6B, and receives negative gate pulses from conductor 133, Fig. 6A, at the same time receiving the test signal through conductor 66. During the periods when both inputs are received the circuit emits the test signal form at conductor 74, repeated four or six times, transmitted only once, or transmitted continuously, depending on the adjustment of rheostat 131 in the gate circuit 77. The coincidence amplifier 73 also clips the signal so that the several components of the test signal have the same maximum voltages.

The output of the 8H delay circuit 76 is also applied to conductor 79 for use when this circuit becomes free-running and generates synthetic vertical synchronizing signals. Conductors 79 and 74 both go to the switch of Fig. 1 as described in connection therewith.

A testing circuit such as is indicated by the block 19 of Fig. 1 which acts as a means for deriving and analyzing the composite test signal after it has been distorted by passage through the particular transmission channel or component under test is conveniently obtained by connecting a cathode ray tube in a suitable circuit so that the cathode ray tube is illuminated during the period of occurrence of one, or if desired several, horizontal line periods, the period of illumination in any case encompassing the time of transmittal of the composite test signal. The circuit arrangement is preferably such that the cathode ray tube beam is deflected horizontally in timed relation to the occurrence of horizontal synchronizing signals so that its position is a measure of time duration, while the vertical deflection is made to correspond to amplitude of received signal potential. In such instance the illumination of the cathode ray tube screen will have a pattern such as depicted by the graph of Fig. 3A, either identical thereto or somewhat debased by the deterioration in quality of the transmission path.

Such a testing circuit is disclosed in Fig. 7, in which the input is taken from any test point 134, here indicated as being a point on a video transmission line. The signal is amplified at 136 and applied to the vertical plates 137 of a cathode ray tube 138. The signal is also applied to circuit 139 which emits as outputs separated vertical and horizontal synchronization signals. The horizontal pulses are applied through a conventional horizontal scanning circuit 141 to the horizontal cathode ray tube plates 142. The vertical pulses are applied to an 8H horizontal line delay circuit 143 and gate generator 144 that are similar to the circuits 76 and 77 of Fig. 6A, the manual adjustment of the gate generator being indicated by knob 146. The output of the gate generator 144 through conductor 147 and a conventional control circuit 148 controls the grid 149 of the cathode ray tube 138.

In operation, this test circuit if set to a gate of a single line duration allows the wave forms of Fig. 3A to be scrutinized for aberrations indicating faults in the television equipment. If the test circuit be set to show 4 or 6 lines, with a test signal of 4 or more lines transmitted, jitter of the television time base may in addition be revealed.

The test signal removal circuit is illustrated in Fig. 8. The input signal at conductor 20 is applied to separating equipment 151 and mixing equipment 152 similar to that indicated at 16 and 17 of Fig. 1. A synchronization signal separator 153 separates the vertical synchronization signal which, after subjection to 8H delay at 154, is used to control a gate generator 156 that normally produces a gate having a duration of 6 horizontal lines although it may be adjusted to duration of 1 or 4 horizontal lines by the adjustment knob 157. The output is applied through a clipper amplifier 158 to the mixing equipment 152 to apply a voltage thereto corresponding to picture black for the adjusted gate duration, thus wiping out the test signal.

What is claimed is:

1. A system for testing the quality of a television transmission circuit while concurrently transmitting video information thereover comprising, means for generating a composite television signal including video, horizontal and vertical synchronizing signals, test generator means operated in response to said horizontal synchronizing signals for cyclically generating a test signal consisting of a plurality of successive wave forms each of which differs from the remainder, the duration of each complete test signal cycle occupying a period of time less than the duration of one horizontal television scan, means operative in response to said vertical synchronizing signals for generating a gating pulse during the "back porch" interval of said vertical synchronizing signals, means for combining said test signal with said composite television signal only during the simultaneous occurrence of said gating signal and said test signal, and means connected to said television circuit at a selected point thereof for separately displaying said test signal.

2. A system for testing the quality of a televison transmission circuit while concurrently transmitting video information thereover comprising, means for generating a composite television signal including video, horizontal and vertical synchronizing signals, means for deriving vertical synchronizing signals from said composite television signal, means for delaying said derived vertical synchronizing signals for a period of time corresponding to at least six horizontal scanning intervals, means operative in response to said delayed vertical synchronizing signals for generating a gating pulse only during the "back porch" interval of said vertical synchronizing signals, test generator means operated in response to said horizontal synchronizing signals for cyclically generating a test signal consisting of a plurality of successive wave forms each of which differs from the remainder, the duration of each complete test signal cycle occupying a period of time less than the duration of one horizontal television scan, means for combining said test signal with said composite television signal only during the simultaneous occurrence of said gating signal and said test signal, and means connected to said television transmission circuit at a selected point thereof for separately displaying said test signal.

3. A test signal generator for generating a signal for testing the quality of transmission of a television transmission circuit on which is impressed a composite television signal including video, horizontal and vertical synchronizing signals comprising, a plurality of signal generators each generating individual wave form signals each of which differs from the remainder, keying means having said horizontal synchronizing signals impressed thereon and producing in response to each horizontal synchronizing signal a cyclic succession of discrete keying signals during a time interval which is less than the period of one horizontal television scan, means for initiating operation of respective ones of said signal generators in response to respective ones of said keying signals, said signal generators having output circuits connected in parallel whereby a test signal is produced which consists of a succession of the wave form signals generated by said signal generators, an adjustable gate means having said vertical synchronizing signals impressed thereon and producing therefrom a gate signal of adjustable time duration but occurring only during the vertical synchronizing signal "back porch" interval, and an output coincidence circuit having said test signal impressed on a first input and said gate signal impressed on a second input.

4. A test signal generator as set forth in claim 3 in which said signal generators include a plurality of signal generators generating alternating current signals of selected different frequencies and a saw-tooth wave generator.

5. A test signal generator as set forth in claim 3 in which said signal generators include a plurality of signal generators generating alternating current signals of selected different frequencies, a saw-tooth wave generator and a staircase wave generator.

6. A test signal generator for generating a signal for testing the quality of transmission of a television transmission circuit on which is impressed a composite television signal including video, horizontal and vertical synchronizing signals comprising, a gate signal generator having said horizontal synchronizing signals impressed thereon and providing in response thereto gate signals whose time duration is greater than the horizontal blanking interval but less than the time duration of one horizontal television scan, a plurality of keying circuits connected in tandem, each of said keying circuits producing a keying signal in response to the termination of a signal impressed on the input thereof, one of said keying circuits having said horizontal synchronizing signals impressed on its input and the remainder having the keying signal of the immediately preceding keying circuit impressed thereon whereby each keying circuit generates its keying signal at successive time intervals, a plurality of signal generators each generating discretely different test signals, each of said signal generators including a coincidence circuit for rendering a particular generator operative by the simultaneous imposition of enabling signals thereon, each of said coincidence circuits having said gate signal and a respective one of said keying signals impressed thereon as enabling signals whereby said generators are operated in time sequence succession, a delay signal generator having said vertical synchronizing signals impressed thereon and producing therefrom a delay signal whose time of occurrence is not less than six horizontal television scan intervals subsequent to the initiation of said vertical synchronizing signal, an adjustable gate generator having said delay signal impressed thereon and producing in response thereto an adjustable gate signal having a duration not exceeding sixteen horizontal television scan intervals, and an output coincidence circuit having said adjustable gate signal impressed on a first input and the outputs of said signal generators impressed on a second input, said output coincidence circuit producing an output signal only as a result of the simultaneous imposition of signals on said first and second inputs.

References Cited in the file of this patent

UNITED STATES PATENTS

| | | |
|---|---|---|
| 2,164,297 | Bedford | June 27, 1939 |
| 2,240,420 | Schnitzer | Apr. 29, 1941 |
| 2,668,188 | Naslund | Feb. 2, 1954 |
| 2,686,220 | Sziklai et al. | Aug. 10, 1954 |